(12) United States Patent  
Hayashide et al.

(10) Patent No.: US 8,749,864 B2  
(45) Date of Patent: Jun. 10, 2014

(54) IMAGE READING OPTICAL SYSTEM AND IMAGE READING APPARATUS

(71) Applicant: Canon Kabushiki Kaisha, Tokyo (JP)

(72) Inventors: Tado Hayashide, Utsunomiya (JP); Takeyoshi Saiga, Utsunomiya (JP); Ikutaro Mitsutake, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/661,216

(22) Filed: Oct. 26, 2012

(65) Prior Publication Data

US 2013/0107333 A1   May 2, 2013

(30) Foreign Application Priority Data

Oct. 28, 2011   (JP) ................. 2011-236966

(51) Int. Cl.
- *G02B 26/08* (2006.01)
- *H04N 1/04* (2006.01)
- *H04N 1/10* (2006.01)

(52) U.S. Cl.
CPC .......... *G02B 26/0816* (2013.01); *H04N 1/1043* (2013.01); *H04N 1/1052* (2013.01)
USPC .................. 359/207.3; 359/207.1; 359/208.1; 358/494; 358/497

(58) Field of Classification Search
CPC . H04N 1/1043; H04N 1/0301; H04N 1/0303; H04N 1/0305; H04N 5/2254; G02B 5/20
USPC ........... 359/205.1–208.2; 358/474, 483, 494, 358/496–497, 296; 355/71; 250/227.26; 399/206, 211
See application file for complete search history.

(56) References Cited

U.S. PATENT DOCUMENTS 6,297,912 B1 * 10/2001 Goto .............................. 359/676

FOREIGN PATENT DOCUMENTS

| JP | 9288254 A | 11/1997 |
| JP | 2006259544 A | 9/2006 |

* cited by examiner

*Primary Examiner* — James Phan  
(74) *Attorney, Agent, or Firm* — Rossi, Kimms & McDowell LLP

(57) ABSTRACT

An image reading optical system, including: an imaging optical system used for imaging a slit area of a document and includes an optical element having different cross section shapes in a main scanning direction and in a sub-scanning direction; an aperture stop; and an optical phase changing filter disposed adjacent to the aperture stop and including a phase lead area and a phase delay area, in which the optical phase changing filter includes a surface shape component that is symmetric only with respect to a predetermined plane including a surface normal at the center of the incident beam and one of the main scanning direction and the sub-scanning direction, and with respect to a surface that includes the surface normal at the center of the incident beam and is perpendicular to the predetermined plane, one side is the phase lead area, and another side is the phase delay area.

12 Claims, 14 Drawing Sheets

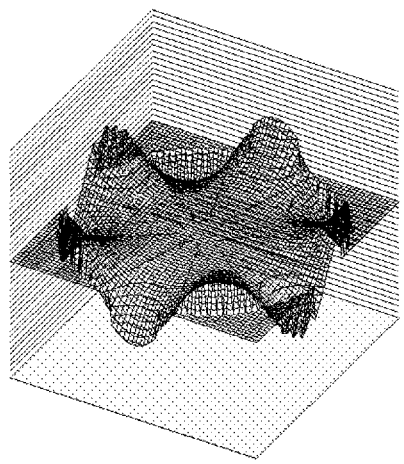
FIG. 3A
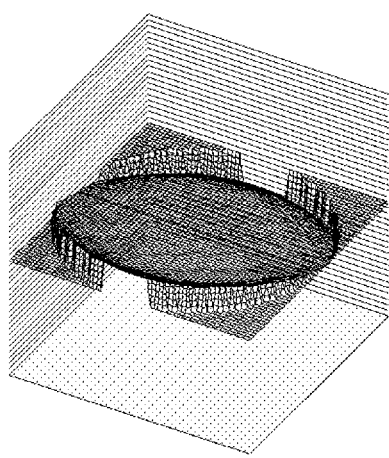
FIG. 3B
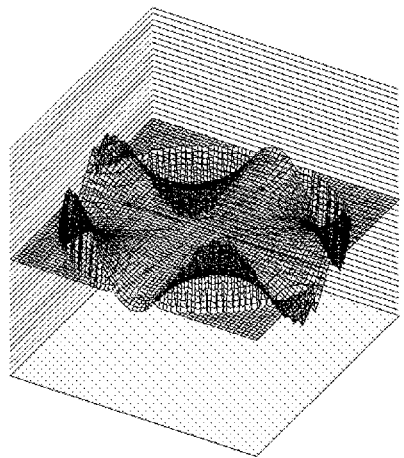
FIG. 3C
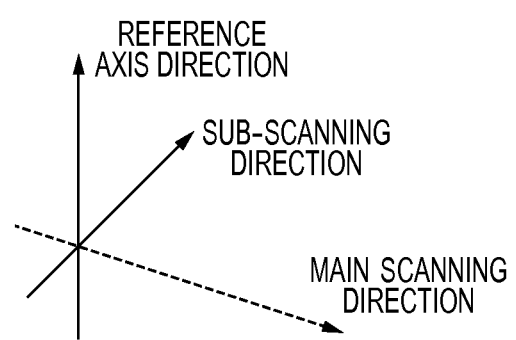

FIG. 15A
FIG. 15B
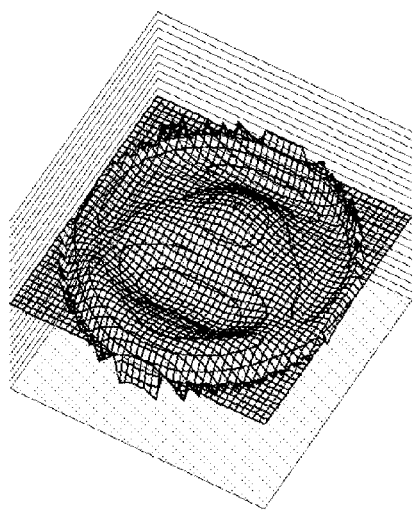
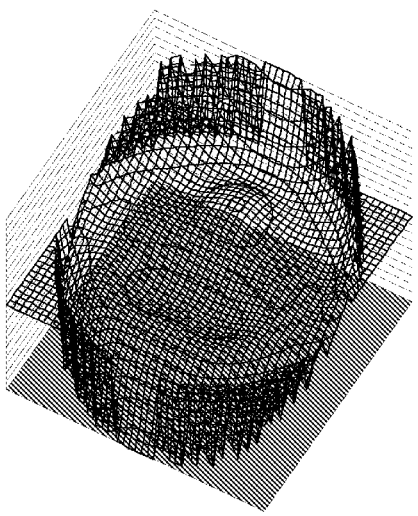
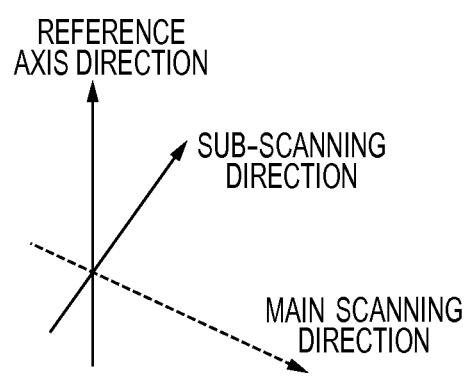

IMAGE READING OPTICAL SYSTEM AND IMAGE READING APPARATUS

BACKGROUND OF THE INVENTION

1. Field of the Invention

The present invention relates to an image reading optical system and an image reading apparatus, and more particularly, to an image reading optical system and an image reading apparatus which are suitable for an image scanner, a digital copying machine, or the like, which needs image reading with large aperture and stable contrast performance.

2. Description of the Related Art

Conventionally, there is an image reading apparatus for reading image information on a platen, which uses a linear image sensor including a plurality of light receiving elements arranged in a main scanning direction. An image of the image information is formed on the linear image sensor by an imaging optical system and a relative position between the document and the linear image sensor is changed in a sub-scanning direction. Thus, the image reading apparatus reads the image information.

FIG. 17 is a schematic diagram of a conventional integrated carriage type scanning image reading apparatus. In FIG. 17, a beam emitted from an illumination light source 81 directly illuminates a document 87 placed on a platen glass 82. An optical path of a reflected beam from the document 87 is folded in a carriage 86 by first, second and third turn back mirrors 83a, 83b and 83c in turn, and hence an image of the image information on the document 87 is formed on a linear image sensor 85 by an imaging lens (imaging optical system) 84.

Then, the carriage 86 is moved in a direction of the arrow A (sub-scanning direction) by a motor 88 for scanning in the sub-scanning direction, and hence the image information on the document 87 is read. The linear image sensor 85 of FIG. 17 has a configuration in which a plurality of light receiving elements are arranged in one-dimensional direction (in the main scanning direction).

FIG. 18 is an explanatory diagram of a basic configuration of a reading optical system of the image reading apparatus illustrated in FIG. 17. In FIG. 18, the imaging optical system 84 is disposed, and the linear image sensor 85 is constituted of linear image sensors 85R, 85G and 85B for reading red (R), green (G) and blue (B) colors, respectively. FIG. 18 further illustrates reading ranges 87R, 87G and 87B on the document 87 to be read by the linear image sensors 85R, 85G and 85B, respectively.

The document 87 is scanned in the sub-scanning direction, so that the same part is read by the linear image sensors for different colors with a certain time interval. In the above-mentioned configuration, if the imaging optical system 84 is constituted of an ordinary refracting system, axial chromatic aberration, lateral chromatic aberration, or the like occurs. Therefore, with respect to the linear image sensor 85G as a reference, defocus or a positional shift occurs in line images formed on the linear image sensors 85B and 85R. Therefore, when the color images are overlaid to reproduce the image, color blurring or color drift becomes conspicuous in the image. In other words, when a performance with large aperture and high resolution is required, the requirement cannot be satisfied.

On the other hand, there is a technology for satisfying the above-mentioned requirement by using an anamorphic optical system that is asymmetric in the main scanning direction and in the sub-scanning direction in an optical system on the precondition of the linear image sensor. In particular, in a non-coaxial optical system among the anamorphic optical systems, it is possible to form an optical system in which aberration is sufficiently corrected by utilizing a concept of reference axis and forming an asymmetric and aspheric element surface.

This non-coaxial optical system is called an off-axial optical system, which is defined as an optical system including a curved surface in which a surface normal of the element surface at an intersection with the reference axis is not on the reference axis (off-axial curved surface) when considering the reference axis along a light beam passing through a center of the image and a center of a pupil. In this case, the reference axis has a folded shape.

This off-axial optical system has an element surface that is usually a non-coaxial surface, and vignetting does not occur on a reflection surface. Therefore, it is easy to constitute an optical system using a reflection surface. In addition, it is easy to form an integrated type optical system by a method of integrally molding a surface on which an optical path can be relatively freely designed.

Japanese Patent Application Laid-Open No. 2006-259544 discloses an off-axial optical system in which two off-axial reflection surfaces are combined. According to this optical system, a mold and a molding machine, which otherwise tend to be expensive, can be integrated, so that manufacturing cost can be significantly reduced. Thus, as illustrated in FIG. 19, it is possible to realize the image reading apparatus having a small size and a small number of components.

In FIG. 19, a light source device 1 is constituted of a fluorescent light, an LED array, or the like. A document (object) 7 is placed on a platen glass 2. FIG. 19 further illustrates a first reflection mirror 3a, a second reflection mirror 3b and a third reflection mirror 3c. An imaging optical system 94 for image reading (off-axial optical system) forms an image of the beam based on image information on the document 7 on a linear image sensor 5 as a reading unit.

In the imaging optical system 94, the surface normal at a reflection point of a reference axis light beam is not on the reference axis. A free-form surface reflection member 4a in which a plurality of reflection surfaces having a free-form surface shape are formed in an integrated manner is disposed to be opposed to a flat reflection member 4b having a flat reflection surface. The image reading apparatus further includes an aperture stop SP disposed on a flat reflection surface R2 of the flat mirror member 4b. For instance, the aperture stop is formed by attaching a black color resin sheet member to the flat mirror surface or by other such methods. The linear image sensor 5 (light receiving unit) constituted of a CCD or the like is disposed at a position corresponding to an image plane. A carriage 6 (case) houses the individual members 1, 3a, 3b, 3c, 94, 5, and the like.

Here, an arranging direction of pixels of the linear image sensor 5 (X direction perpendicular to the drawing sheet) is regarded as a main scanning direction, and a direction perpendicular to the main scanning direction (Y direction in the drawing sheet) is regarded as a sub-scanning direction. A propagation direction of the beam is regarded as a Z direction. In this case, an XZ plane is a main scanning cross section, and an YZ plane is a sub-scanning cross section. The beam emitted from the light source device 1 illuminates the document (object) 7 placed on the platen glass 2, and the beam from the document 7 enters an off-axial reflection surface R1 of the off-axial reflection surface member 4a via the first reflection mirror 3a, the second reflection mirror 3b and the third reflection mirror 3c.

Then, the beam reflected by the off-axial reflection surface R1 enters the flat reflection surface R2 of the flat mirror member 4b so as to be reflected at an acute angle. After that, the beam enters an off-axial reflection surface R3 different from the off-axial reflection surface R1 and is reflected. Then, an image of the beam is formed on the linear image sensor 5. Note that, in this case, individual reflection surfaces fold the optical path in the sub-scanning cross section. Further, the relative position of the carriage 6 to the document 7 is changed in the sub-scanning direction (the direction of the arrow A), so that image information on the document 7 is read in a two-dimensional manner.

In order to compactly constitute the image reading apparatus, the first reflection mirror 3a, the second reflection mirror 3b and the third reflection mirror 3c fold the optical path. The imaging optical system 94 also contributes to folding of the optical path. In this conventional example, an f-number (Fno) is designed to be 6.0, a magnification is designed to be 0.11, and an object height is designed to be 150 mm. FIG. 22A shows modulation transfer function (MTF) depth characteristics at 60 lines pair/mm on the image plane. A solid line indicates MTF in the sub-scanning direction (S_MTF). A broken line indicates MTF in the main scanning direction (M_MTF). A center 0 of a horizontal axis is a focusing position.

In the imaging optical system 94, the optical path is folded in substantially a Z shape by off-axial surfaces so that decentering aberrations generated on the off-axial reflection surfaces can be easily canceled by each other. Further, the flat mirror member is used so as to fold in a Σ shape without affecting the aberration. Thus, in spite of a simple configuration of one flat mirror member and one off-axial reflection surface member, good imaging performance is obtained.

In recent years, image reading apparatus have been required to support higher speed, and the optical system has been required to have larger aperture. The conventional off-axial optical system of FIG. 20 is caused to have large aperture at the f-number of 4.0 as an optical system illustrated in FIG. 21. The MTF depth characteristics of this optical system are shown in FIG. 22B. In general, the large aperture optical system has a high MTF at the focusing position, which is rapidly decreased in a defocused position. In addition, when the aberration is large, the MTF is low even in in-focus state and is further decreased by a focal point shift.

In particular, in the anamorphic optical system including the off-axial optical system, characteristics in the main scanning direction are not the same as characteristics in the sub-scanning direction. Therefore, as shown in FIGS. 22A and 22B, the MTF in the sub-scanning direction indicated by a solid line indicates a high MTF value at a position 0 of the in-focus state and is rapidly decreased when the focal point shift occurs. In the main scanning direction indicated by a broken line, the MTF value of aberration is lower than that in the sub-scanning direction even in the in-focus state and is further decreased by the focal point shift. FIG. 23 illustrates wavefront aberration in the focusing position of FIGS. 22A and 22B. In general, an aberration amount is larger as being closer to a periphery, and hence the aberration amount is increased when a larger aperture is achieved.

If the focal point shift occurs in the image reading apparatus, not only image deterioration but also various problems occur. For instance, a process for sharpening an image is optimized at the time of shipment from the factory. Therefore, if the focal point shift from the state occurs, an appropriate process cannot be performed, so that an image cannot be sharpened. Therefore, it is desired that the MTF value be always stable. As an index of whether or not the MTF value is stable, the following Equation 1 can be used.

MTF stability $MS=((\text{highest MTF})-(\text{lowest MTF}))/$
$((\text{highest MTF})+(\text{lowest MTF}))(\%)$  Equation 1

In the conventional optical system shown in FIG. 22A, the stability MS is 4.6% at a position within a range of ±1 step of the focusing position. Here, "1 step" is defined as equivalent of 0.025 mm. Therefore, the range of ±1 step of the focusing position corresponds to a movement range of an imaging plane as ±0.025 mm from the focusing position. It is preferred that the stability be 8% or lower so that the above-mentioned problem does not become conspicuous. In the conventional optical system shown in FIG. 22B, the stability MS is 14.4% at a position within a range of ±1 step of the focusing position and is required to be improved.

The focal point shift may be caused by various phenomena. For instance, if the ambient temperature of the image reading apparatus is extremely high or low, the optical element may be deformed, so that the focal point shift may occur. Other than that, if vibration in the installation or transportation is large, a positional shift may cause the focal point shift. At present, in order not to generate the focal point shift described above, there are taken measures such as air conditioning or packing for installation environment or vibration. However, along with economic growth in developing countries, there may be a case where the apparatus is used in an unexpected installation environment or a case where the apparatus is transported in bad road conditions.

Therefore, taking measures against the focal point shift is important for the image reading optical system. As measures against the focal point shift, there are measures such as incorporation of a focus adjustment mechanism, and the like. However, in the image reading apparatus, the carriage moves at high speed as described above, and hence it is difficult to incorporate a weight-increasing mechanism such as the focus adjustment mechanism. Therefore, it is necessary to realize the optical system having a small variation of contrast performance even if the focal point shift occurs.

On the other hand, there is a technology enabling to reduce a variation of contrast performance even if the focal point shift occurs. Japanese Patent Application Laid-Open No. H09-288254 discloses a technology for correcting the contrast performance by an optical phase changing filter with an N- (2-, 3-, . . . ) fold symmetry including a phase lead area having a phase lead action of leading a phase of a wavefront of an incident beam and a phase delay area having a phase delay action of delaying the phase of the wavefront of the incident beam. The N-fold symmetry means that the same shape is obtained before and after rotation by an angle of 360/N degrees about the reference axis. In this case, with respect to the plane that includes the surface normal at the center of the incident beam and is perpendicular to the above-mentioned symmetric plane, one side is regarded as the phase lead area, while the other side is regarded as the phase delay area.

The technology disclosed in Japanese Patent Application Laid-Open No. H09-288254 can be effective in a camera or the like, which uses a general imaging optical system disposed in a rotationally symmetric manner about the optical axis. In other words, it is possible to provide an imaging optical system having little variation of the contrast performance due to the focal point shift as a general imaging optical system disposed in a rotationally symmetric manner.

However, the above-mentioned technology is not sufficiently effective in an image reading apparatus that uses an anamorphic imaging optical system for forming an image of a slit area (imaging optical system having different cross section shapes between the main scanning direction as a longitudinal direction of the slit area and the sub-scanning direction perpendicular to the main scanning direction). In other words, an imaging optical system having little variation of the contrast performance due to the focal point shift cannot be provided as an anamorphic imaging optical system.

SUMMARY OF THE INVENTION

In order to solve the above-mentioned problem, according to an exemplary embodiment of the present invention, there is provided an image reading optical system, including: an imaging optical system which is used for imaging a slit area of a document on an image sensor and includes an optical element having different cross section shapes in a main scanning direction as a longitudinal direction of the slit area and in a sub-scanning direction perpendicular to the main scanning direction; an aperture stop disposed in an imaging optical path from the document to the image sensor; and an optical phase changing filter which is disposed adjacent to the aperture stop and includes a phase lead area having a phase lead action of leading a phase of a wavefront of an incident beam, and a phase delay area having a phase delay action of delaying the phase of the wavefront of the incident beam, with reference to a wavefront phase at a center of the incident beam, in which the optical phase changing filter includes a surface shape component that is symmetric only with respect to a predetermined plane including a surface normal at the center of the incident beam and one of the main scanning direction and the sub-scanning direction, and with respect to a surface that includes the surface normal at the center of the incident beam and is perpendicular to the predetermined plane, one side is the phase lead area, and another side is the phase delay area.

Further, according to another exemplary embodiment of the present invention, there is provided an image reading optical system, including: an imaging optical system which is used for imaging a slit area of a document on an image sensor and includes an optical element having different cross section shapes in a main scanning direction as a longitudinal direction of the slit area and in a sub-scanning direction perpendicular to the main scanning direction; an aperture stop disposed in an imaging optical path from the document to the image sensor; and an optical phase changing filter which is disposed adjacent to the aperture stop and includes a phase lead area having a phase lead action of leading a phase of a wavefront of an incident beam, and a phase delay area having a phase delay action of delaying the phase of the wavefront of the incident beam, with reference to a wavefront phase at a center of the incident beam, in which the optical phase changing filter includes, on one of a single surface and different surfaces of the optical phase changing filter: a first surface shape component that is symmetric with respect to a plurality of symmetric planes including a surface normal at the center of the incident beam; and a second surface shape component that is symmetric only with respect to a predetermined plane including the surface normal at the center of the incident beam and one of the main scanning direction, and the sub-scanning direction and in the first surface shape component and the second surface shape component, with respect to a surface that includes the surface normal at the center of the incident beam and is perpendicular to one of the predetermined plane and the plurality of symmetric planes, one side is the phase lead area, and another side is the phase delay area.

Further features of the present invention will become apparent from the following description of exemplary embodiments with reference to the attached drawing.

BRIEF DESCRIPTION OF THE DRAWINGS

FIG. 3A is a schematic diagram illustrating a shape of an optical phase changing filter according to the first embodiment.

FIG. 3B is a schematic diagram illustrating a shape of the optical phase changing filter according to the first embodiment.

FIG. 3C is a schematic diagram illustrating a shape of the optical phase changing filter according to the first embodiment.

FIG. 15A is a diagram illustrating wavefront aberration of the third embodiment.

FIG. 15B is a diagram illustrating the wavefront aberration of the third embodiment.

DESCRIPTION OF THE EMBODIMENTS

Preferred embodiments of the present invention will now be described in detail in accordance with the accompanying drawings.

First Embodiment

Image Reading Optical System

Figure 1:
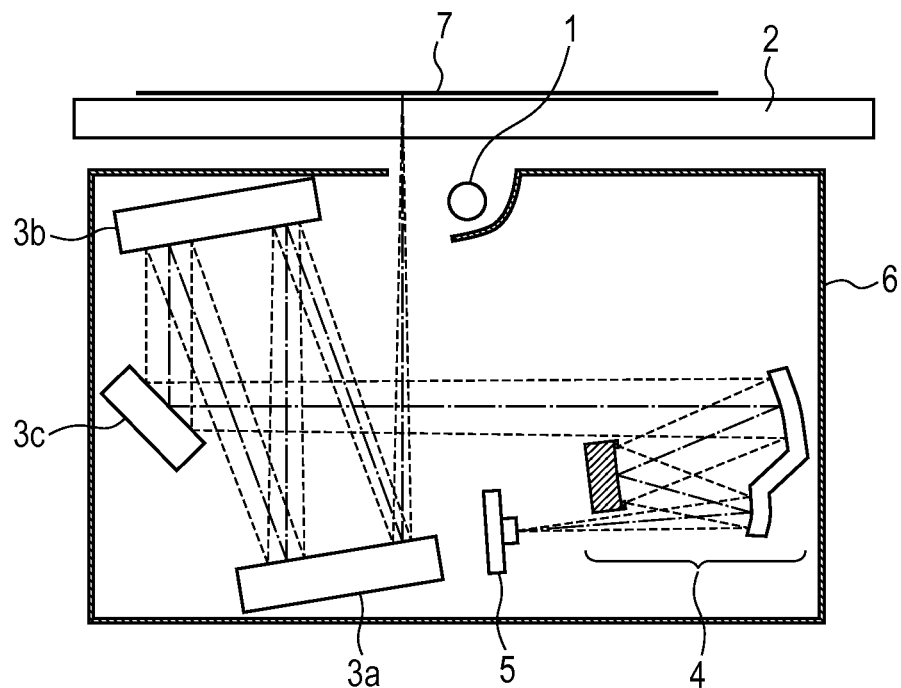
FIG. 1 is a schematic diagram of a main part of an image reading apparatus equipped with an image reading optical system according to a first embodiment of the present invention.
Figure 2:
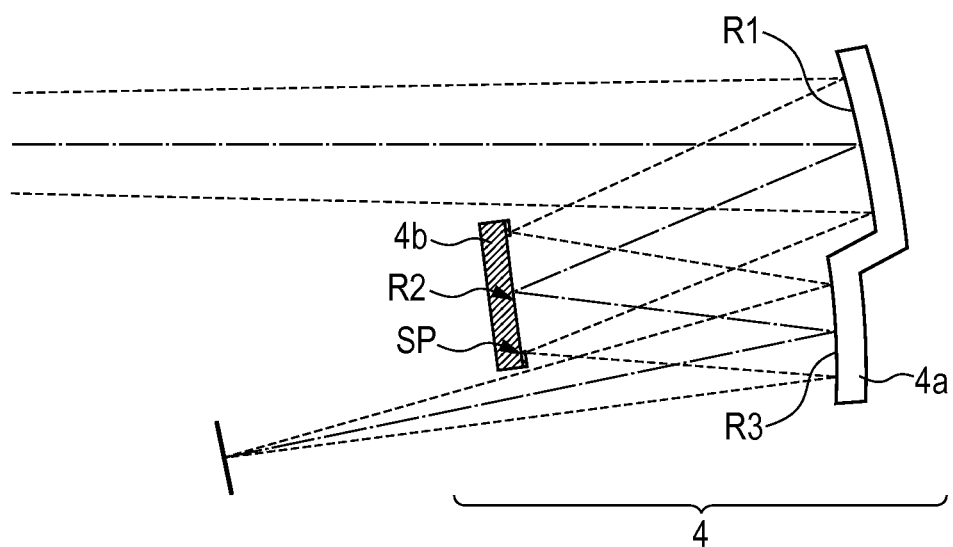
FIG. 2 is a cross-sectional view of a main part of the image reading optical system illustrating an entire configuration thereof in a YZ plane of the first embodiment.

Hereinafter, an image reading optical system including an off-axial imaging optical system according to a first embodiment of the present invention is described. FIG. 1 is a schematic diagram of a main part of an image reading apparatus of this embodiment in a sub-scanning cross section. FIG. 2 is a schematic diagram in the sub-scanning cross section when an imaging optical system 4 of FIG. 1 is extracted. FIGS. 3A, 3B and 3C are diagrams illustrating shapes of a reflection surface R2 disposed above an optical phase changing filter of FIG. 2. In FIG. 1, a light source device 1 is constituted of a fluorescent light, an LED array, or the like. A document (object) 7 is placed on a platen glass 2. FIG. 1 further illustrates a first reflection mirror 3a, a second reflection mirror 3b and a third reflection mirror 3c.

The imaging optical system 4 for image reading (off-axial optical system) forms an image of the beam based on image information on the document 7 on a linear image sensor 5 as a reading unit. The imaging optical system 4 is an off-axial optical system in which the surface normal at a reflection point of a reference axis light beam is not on a reference axis. A free-form surface reflection member 4a, in which a plurality of reflection surfaces having a free-form surface shape are formed in an integrated manner, is disposed to be opposed to an optical phase changing filter 4b having a reflection surface. The image reading apparatus further includes an aperture stop SP disposed on a reflection surface R2 of the optical phase changing filter 4b. For instance, the aperture stop might be formed by attaching a black color resin sheet member to the surface of the optical phase changing filter or by other such methods.

The linear image sensor 5 (light receiving unit) constituted of a CCD or the like is disposed at a position corresponding to an image plane. A carriage 6 (case) houses the individual members 1, 3a, 3b, 3c, 4, 5, and the like. Here, an arranging direction of pixels of the linear image sensor 5 (X direction perpendicular to the drawing sheet) is regarded as a main scanning direction, and a direction perpendicular to the main scanning direction (Y direction in the drawing sheet) is regarded as a sub-scanning direction. A propagation direction of the beam is regarded as a Z direction. In this case, an XZ plane is a main scanning cross section, and a YZ plane is a sub-scanning cross section.

In this embodiment, the beam emitted from the light source device 1 illuminates the document (object) 7 placed on the platen glass 2. Then, the beam from the document 7 enters an off-axial reflection surface R1 of the off-axial reflection surface member 4a via the first reflection mirror 3a, the second reflection mirror 3b and the third reflection mirror 3c. The beam reflected by the off-axial reflection surface R1 enters the reflection surface R2 of the optical phase changing filter 4b and is reflected at an acute angle. After that, the beam enters an off-axial reflection surface R3 different from the off-axial reflection surface R1. Then, after the beam is reflected by the off-axial reflection surface R3, an image of the beam is formed on the linear image sensor 5. Elements other than the optical phase changing filter may be the same as those of the conventional optical system.

Basic Action of Optical Phase Changing Filter

Figure 16:
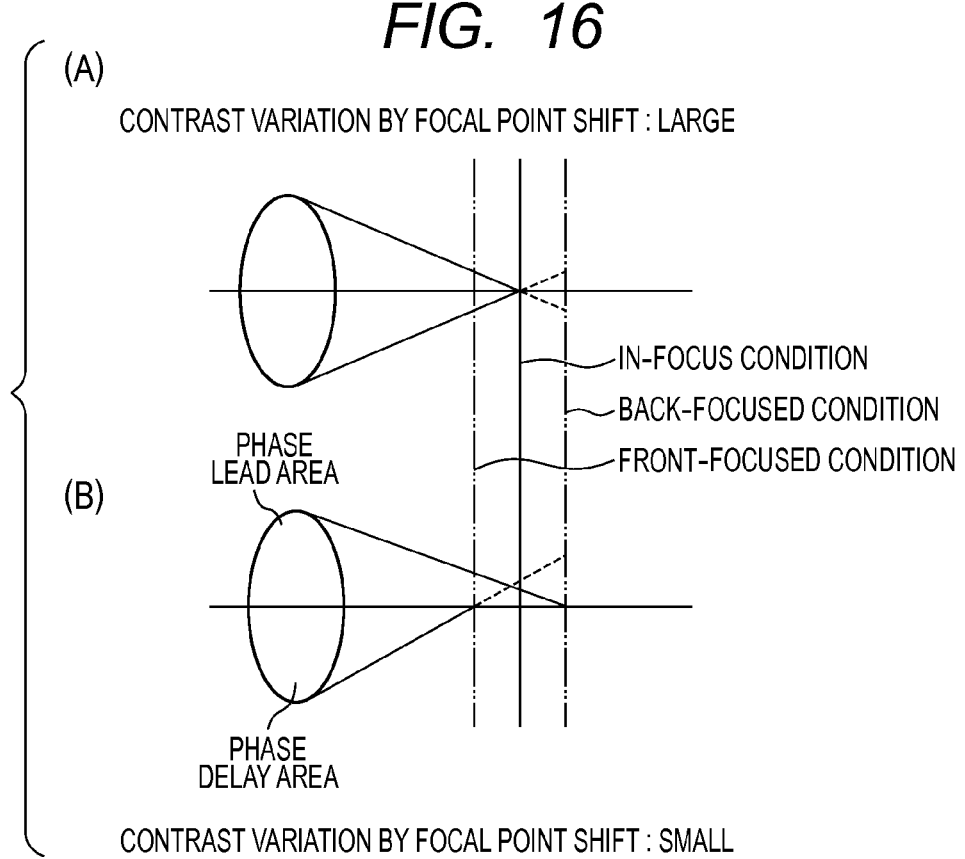
FIG. 16 is a diagram illustrating a basic action with a small contrast performance variation due to a focal point shift of the optical phase changing filter according to the embodiments of the present invention.
Figure 17:
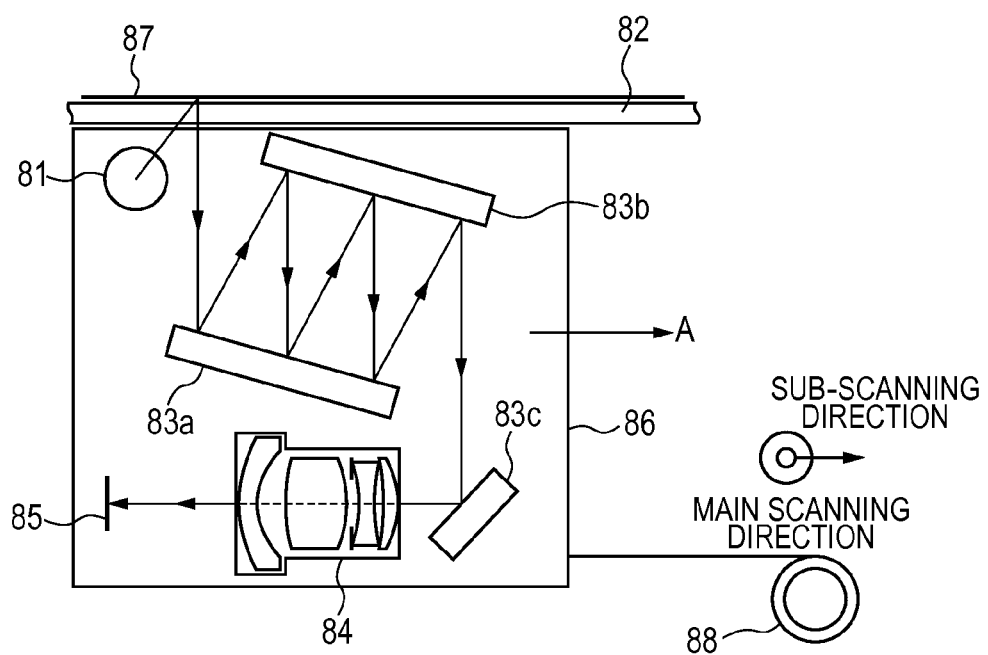
FIG. 17 is a schematic diagram of a main part of a conventional image reading apparatus.
Figure 18:
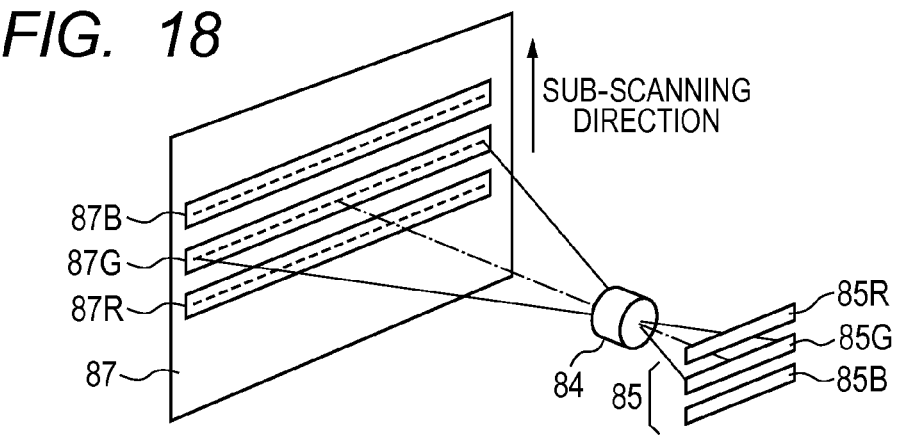
FIG. 18 is a basic configuration diagram of the conventional color image reading apparatus.
Figure 19:
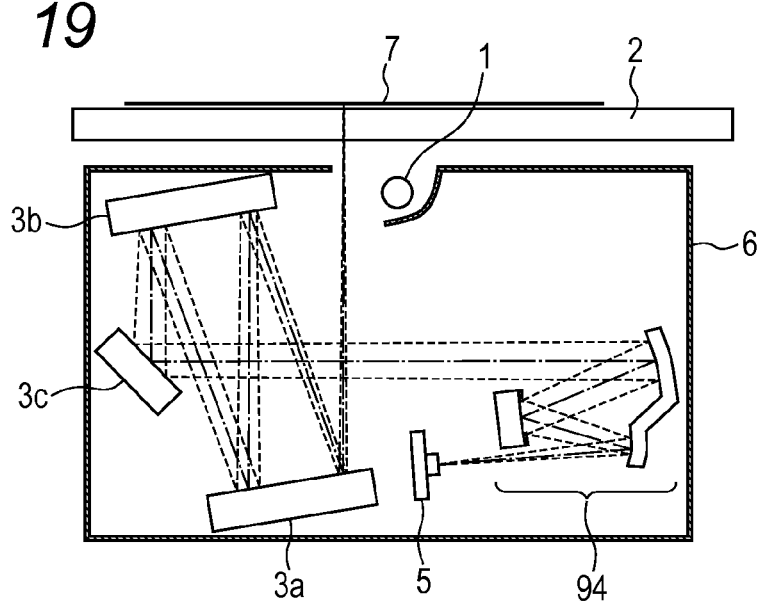
FIG. 19 is a schematic diagram of a main part of an image reading apparatus using a conventional off-axial optical system.
Figure 20:
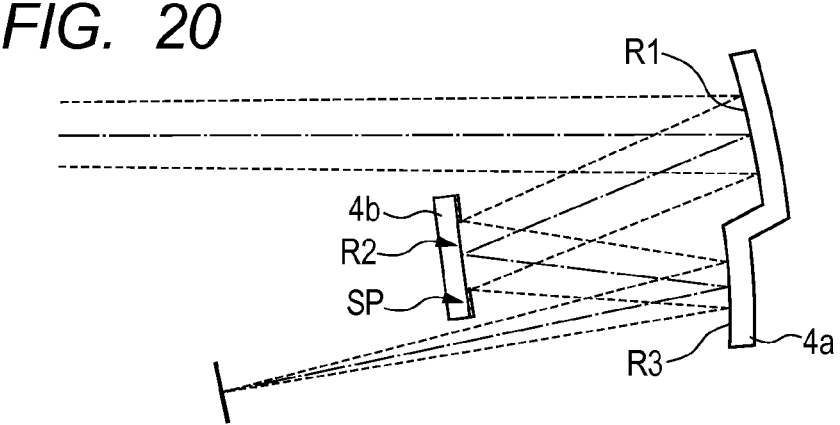
FIG. 20 is a cross-sectional view of a main part of the conventional off-axial optical system illustrating an entire configuration thereof in the YZ plane.
Figure 21:
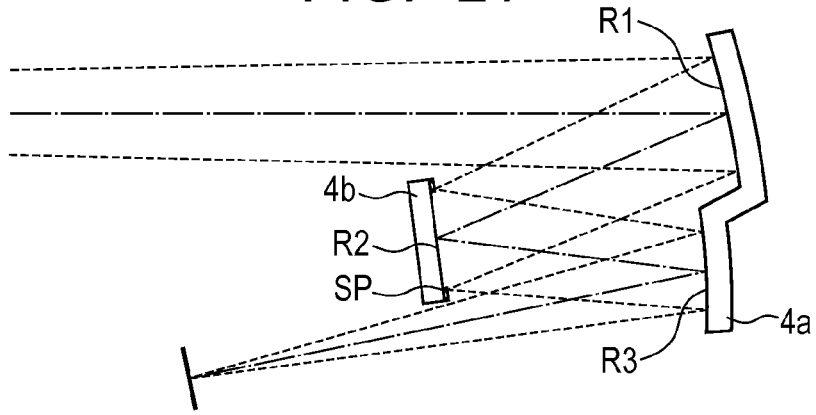
FIG. 21 is a cross-sectional view of a main part of a conventional large aperture off-axial optical system illustrating an entire configuration thereof in the YZ plane.
Figure 22A:
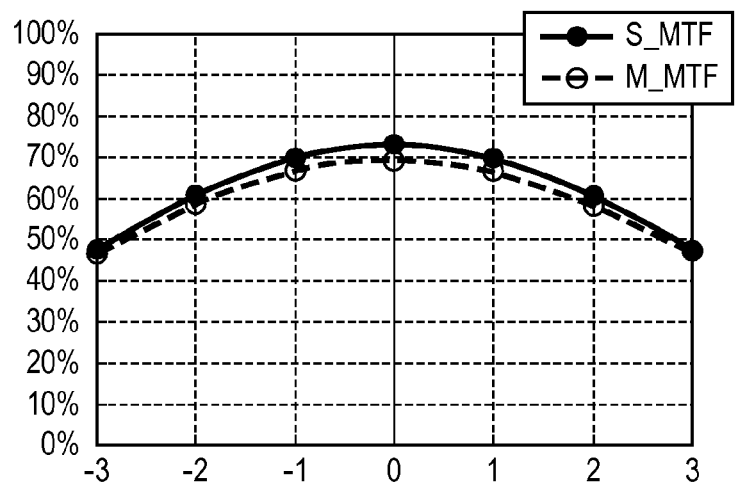
FIG. 22A is a graph showing the MTF defocus characteristics of the conventional large aperture off-axial optical system.
Figure 22B:
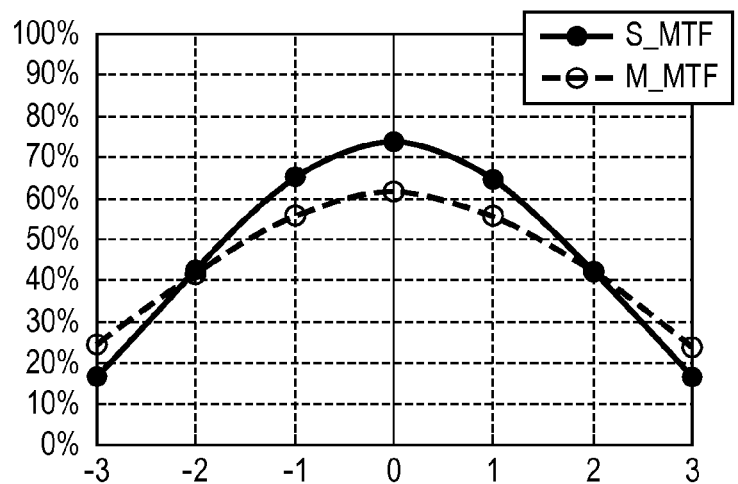
FIG. 22B is a graph showing the MTF defocus characteristics of the conventional large aperture off-axial optical system.
Figure 23:
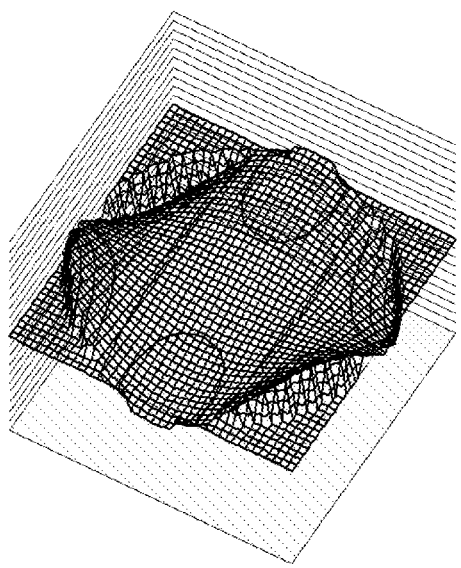
FIG. 23 is a diagram illustrating wavefront aberration of the conventional large aperture off-axial optical system.
Figure 23:
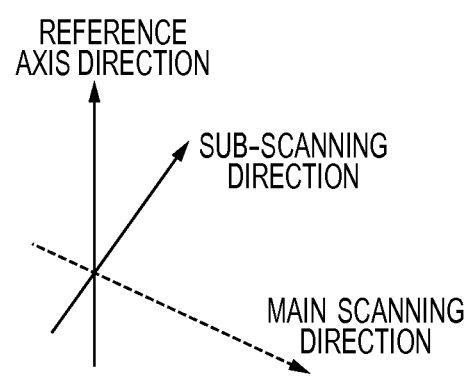

A basic action of the optical phase changing filter according to this embodiment is illustrated in (B) of FIG. 16. The optical phase changing filter is disposed in a vicinity of the aperture stop disposed in an imaging optical path from the document to the image sensor. This optical phase changing filter includes a phase lead area having a phase lead action of leading a phase of a wavefront of an incident beam, and a phase delay area having a phase delay action of delaying the phase of the wavefront of the incident beam, with reference to a wavefront phase at the center of the incident beam. Compared with (A) of FIG. 16 illustrating the conventional technology, it is understood that (B) of FIG. 16 illustrates an imaging optical system having little variation of the contrast performance due to the focal point shift.

In other words, when the filter is disposed in a vicinity of the aperture stop of the imaging optical system, an image is formed in a back-focused condition in the phase lead area positioned on an upper side of the imaging optical element of (B) of FIG. 16 (illustrated simply here as a transmissive lens), while the image is formed in a front-focused condition in the phase delay area positioned on a lower side of the imaging optical element. Thus, compared with the case of (A) of FIG. 16 in which a contrast variation is large among positions of the front-focused condition, an in-focus condition and the back-focused condition, it is possible to control the contrast variation to be small in (B) of FIG. 16 among the positions of the front-focused condition, the in-focus condition and the back-focused condition.

Optical Phase Changing Filter in First Embodiment

The reflection surface R2 as a single surface of the optical phase changing filter 4b that is a reflecting filter has a surface shape having a characteristic illustrated in FIG. 3C. The surface shape illustrated in FIG. 3C is a combination (addition) of a first surface shape component illustrated in FIG. 3A and a second surface shape component illustrated in FIG. 3B.

1) First Surface Shape Component

The surface illustrated in FIG. 3A is a symmetric plane in which the same shape is obtained before and after rotation by an angle of 72° about a center axis to be a reference, and is expressed by the following Equation 2:

$$S(\rho,\phi) = A \times \rho^i \times \cos(m\phi + \alpha) \quad \text{Equation 2,}$$

where A=0.109 μm, i=5, m=5, and α=0°, ρ is a value normalized by a radius in a radial direction coordinate and satisfies 0≤ρ≤1, φ is a value in a rotation direction coordinate and satisfies $0° \leq \phi \leq 360°$, A is a constant, i is a value to determine a shape in the radial direction, m is a value indicating rotation symmetry, and a is an initial phase.

This angle 72° is equal to a value of 360/5 degrees, and hence this symmetry is generally called a five-fold symmetry.

This surface has protrusions and recesses repeated periodically about the center axis. The protrusion reflects light earlier than other areas, and hence the protrusion has the phase lead action of causing the beam wavefront to propagate earlier. The protrusion protrudes higher as being closer to a periphery from the center axis. On the other hand, the recess reflects light later than other areas, and hence the recess has the phase delay action of causing the beam wavefront to propagate later with a delay. The recess sinks deeper as being closer to a periphery from the center axis.

The beam is partially directed to positions before and after the focusing position as the imaging optical system by giving a phase lead and a phase delay periodically, and hence the defocus characteristics become stable before and after the focusing position. When the phase lead and the phase delay are repeated, there is no difference of the characteristics between the main scanning direction and the sub-scanning direction, and there is an effect that the defocus characteristics become stable in both directions.

2) Second Surface Shape Component

The surface illustrated in FIG. 3B is a surface in which the same shape is obtained only by rotating 360° about the center axis to be the reference and is expressed by the following Equation 3. As to this second surface shape component, the optical phase changing filter has the following condition. Specifically, the surface of the optical phase changing filter has a surface component of a symmetric shape only with respect to a predetermined plane including the surface normal at the center of the incident beam and the main scanning direction or the sub-scanning direction. Further, with respect to a plane that includes the surface normal at the center of the incident beam and is perpendicular to the predetermined plane, one side is regarded as the phase lead area, and the other side is regarded as the phase delay area.

$$T(\rho,\phi) = B \times \rho^j \times \cos(\phi + \beta) \quad \text{Equation 3,}$$

where B=0.164 μm, j=5, and β=180°, ρ is a value normalized by a radius in a radial direction coordinate and satisfies $0 \leq \rho \leq 1$, φ is a value in a rotation direction coordinate and satisfies $0° \leq \phi \leq 360°$, B is a constant, j is a value to determine a shape in the radial direction, and β is an initial phase.

Figure 4A:
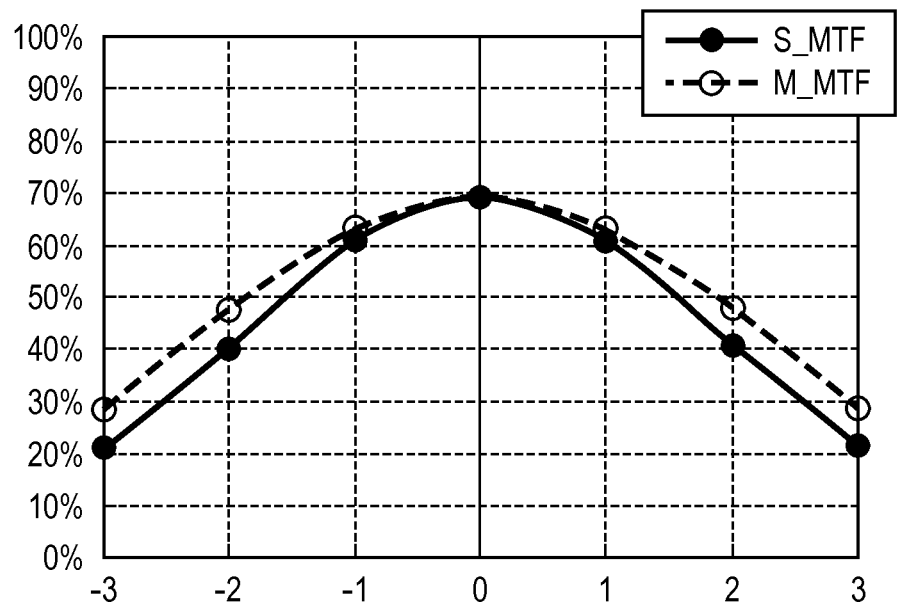
FIG. 4A is a graph showing MTF defocus characteristics of the first embodiment.

This symmetry is called a one-fold symmetry. The surface has a characteristic of having the phase lead action and the phase delay action in one of two directions which are at right angles to each other but having none of the phase lead action and the phase delay action in the other direction. Therefore, the surface has an action of correcting aberration specialized in the main scanning direction or the sub-scanning direction. In this embodiment, the phase lead action and the phase delay action are given to the sub-scanning direction, and the surface is combined with the surface of FIG. 3A. As a result, as shown in FIG. 4A, the same MTF defocus characteristics can be obtained in the main scanning and in the sub-scanning. At a position within a range of ±1 step of the focusing position, the stability MS is 6.5%, so that sufficiently stable MTF characteristics can be obtained. Here, "1 step" is defined as equivalent of 0.025 mm. Therefore, the range of ±1 step of the focusing position corresponds to a movement range of an imaging plane as ±0.025 mm from the focusing position.

Figure 4B:
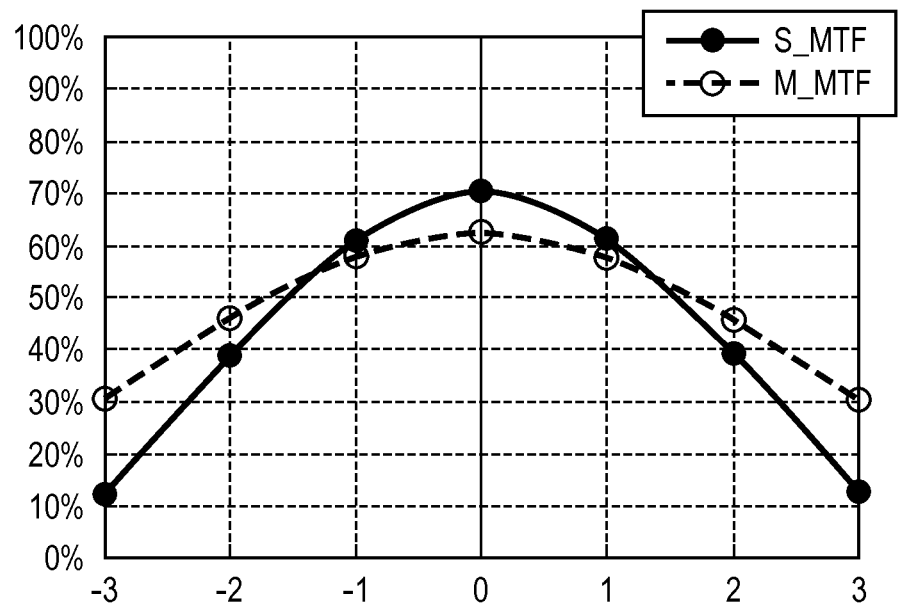
FIG. 4B is a graph showing the MTF defocus characteristics of the first embodiment.

If the surface is constituted of only the surface of FIG. 3A, there is still a variation of the MTF value between the main scanning direction and the sub-scanning direction as shown in FIG. 4B. At a position within a range of ±1 step of the focusing position, the stability MS is 9.8% that is not sufficient for stabilizing the MTF in order to solve the problem to be solved by the present invention. By combining the surface of FIG. 3B, the problem can be solved. In other words, as to the MTF values in the main scanning direction and in the sub-scanning direction, the first surface shape component is not sufficient but can be supplemented by adding the second surface shape component.

Figure 5:
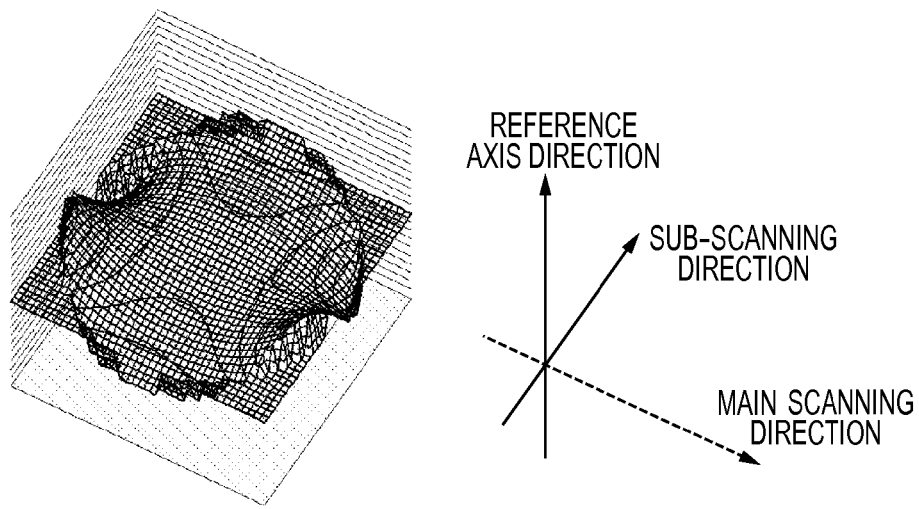
FIG. 5 is a diagram illustrating wavefront aberration of the first embodiment.

A wavefront aberration amount at the focusing position 0 of FIG. 4A is illustrated in FIG. 5. The aberration in the main scanning direction and the aberration in the sub-scanning direction are balanced, and fine waving aberration is generated. Thus, it is understood that the MTF stability has been improved. When the imaging optical system 4 having the above-mentioned configuration is used, only by replacing the flat mirror of the conventional optical system with the optical phase changing filter 4b, it is possible to provide the image reading apparatus that can support high speed reading by the larger aperture. The image reading apparatus of this embodiment described above is suitable for reading a document having an A3 size (300 mm×420 mm), for example.

Second Embodiment

Figure 6:
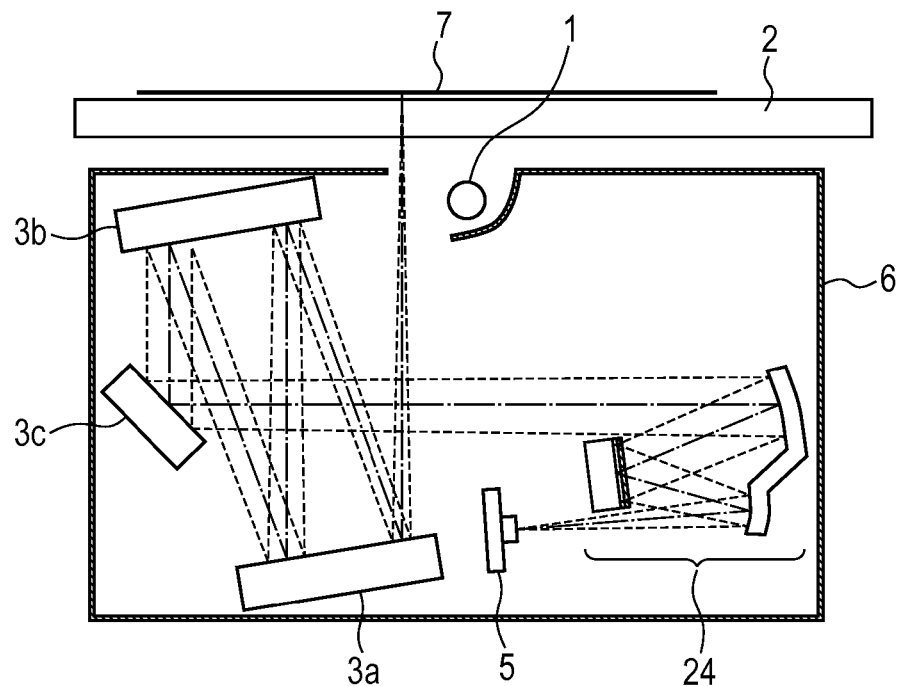
FIG. 6 is a schematic diagram of a main part of an image reading apparatus according to a second embodiment of the present invention.
Figure 7:
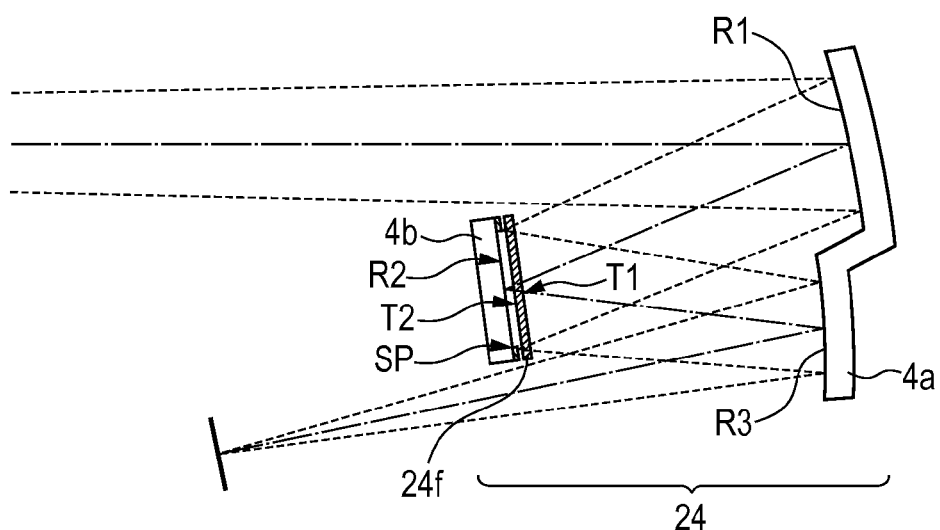
FIG. 7 is a cross-sectional view of a main part of an image reading optical system illustrating an entire configuration thereof in the YZ plane of the second embodiment.
Figure 8A:
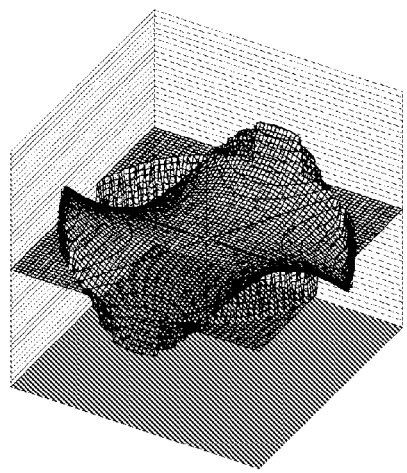
FIG. 8A is a schematic diagram illustrating a shape of an optical phase changing filter of the second embodiment.
Figure 8B:
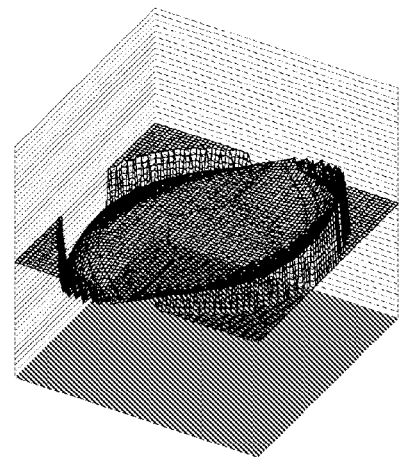
FIG. 8B is a schematic diagram illustrating a shape of the optical phase changing filter of the second embodiment.
Figure 8B:
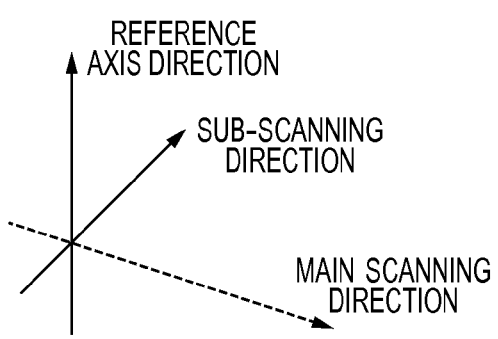

Hereinafter, an off-axial optical system according to a second embodiment of the present invention is described. FIG. 6 is a schematic diagram of a main part of an image reading apparatus of this embodiment in the sub-scanning cross section when the imaging optical system of this embodiment is applied to the image reading apparatus. FIG. 7 is a schematic diagram in the sub-scanning cross section when an imaging optical system 24 of FIG. 6 is extracted. FIGS. 8A and 8B are diagrams illustrating shapes of transmission surfaces T1 and T2 disposed on the optical phase changing filter of FIG. 7. Other elements than the imaging optical systems 4 and 24 are the same as those of the first embodiment.

The imaging optical system 24 is the off-axial optical system in which the surface normal at the reflection point of the reference axis light beam is not on the reference axis. A free-form surface reflection member 4a in which a plurality of reflection surfaces having a free-form surface shape are formed in an integrated manner is disposed so as to be opposed to a reflection member 4b having a flat reflection surface and to an optical phase changing filter 24f disposed so as to be adjacent to the reflection member. The image reading apparatus further includes an aperture stop SP disposed on a reflection surface R2 of the flat reflection member 4b. For instance, the aperture stop is formed by attaching a black color resin sheet member to the surface of the optical phase changing filter or by other such methods.

A linear image sensor 5 (light receiving unit) constituted of a CCD or the like is disposed at a position corresponding to an image plane. A carriage 6 (case) houses the individual members 1, 3a, 3b, 3c, 24, 5, and the like. Here, an arranging direction of pixels of the linear image sensor 5 (X direction perpendicular to the drawing sheet) is regarded as a main scanning direction, and a direction perpendicular to the main scanning direction (Y direction in the drawing sheet) is regarded as a sub-scanning direction. A propagation direction of the beam is regarded as a Z direction. In this case, an XZ plane is a main scanning cross section, and a YZ plane is a sub-scanning cross section.

In this embodiment, the beam emitted from the light source device 1 illuminates a document (object) 7 placed on a platen glass 2. Then, the beam from the document 7 enters an off-axial reflection surface R1 of the off-axial reflection surface member 4a via a first reflection mirror 3a, a second reflection mirror 3b and a third reflection mirror 3c. Further, after the beam reflected by the off-axial reflection surface R1 passes through the surface T1 and the surface T2 of the optical phase changing filter 24f in turn, the beam enters the reflection surface R2 of the reflection member 4b so as to be reflected at an acute angle.

Hereinafter, the beam passes through the surface T2 and the surface T1 of the optical phase changing filter 24f again, and enters an off-axial reflection surface R3 different from the off-axial reflection surface R1. After the beam is reflected, an image of the beam is formed on the linear image sensor 5. Other elements than the optical phase changing filter may be the same as those of the conventional optical system.

Optical Phase Changing Filter in Second Embodiment

The optical phase changing filter in the second embodiment is basically the same as that in the first embodiment, but the transmission surface T1 as a front surface of the optical phase changing filter 24f as the transmissive filter includes a surface shape component illustrated in FIG. 8A, while the transmission surface T2 as a rear surface includes a surface shape component illustrated in FIG. 8B.

1) First Surface Shape Component

The transmission surface T1 of the optical phase changing filter 24f has a surface shape having a characteristic illustrated in FIG. 8A. The surface illustrated in FIG. 8A is a symmetric plane in which the same shape is obtained before and after rotation by an angle of 120° about the center axis to be the reference and is expressed by the following Equation 4.

$$S(\rho,\phi)=A\times\rho^i\times\cos(m\phi+\alpha) \qquad \text{Equation 4,}$$

where A=0.205 µm, i=3, m=3, and α=180°.

This angle 120° is equal to a value of 360/3 degrees, and hence this symmetry is generally called a three-fold symmetry. This surface has protrusions and recesses repeated periodically about the center axis. The protrusion refracts light earlier than other areas, and hence the protrusion has the phase delay action of causing the beam wavefront to propagate later. The protrusion protrudes higher as being closer to a periphery from the center axis. On the other hand, the recess refracts light later than other areas, and hence the recess has the phase lead action of causing the beam wavefront to propagate earlier. The recess sinks deeper as being closer to a periphery from the center axis.

The beam is partially directed to positions before and after the focusing position as the imaging optical system by giving a phase lead and a phase delay periodically, and hence the defocus characteristics become stable before and after the focusing position. When the phase lead and the phase delay are repeated, there is no difference of the characteristics between the main scanning direction and the sub-scanning direction, and there is an effect that the defocus characteristics become stable in both directions.

2) Second Surface Shape Component

The transmission surface T2 of the optical phase changing filter 24f has a surface shape having a characteristic illustrated in FIG. 8B. The surface illustrated in FIG. 8B is a surface in which the same shape is obtained only by rotating 360° about the center axis to be the reference and is expressed by the following Equation 5.

$$T(\rho,\phi)=B\times\rho^j\times\cos(\phi+\beta) \qquad \text{Equation 5,}$$

where B=0.287 µm, j=7, and β=90°.

This symmetry is called a one-fold symmetry. The surface has a characteristic of having the phase lead action and the phase delay action in one of two directions which are at right angles to each other but having none of the phase lead action and the phase delay action in the other direction. Therefore, the surface has an action of correcting aberration specialized in the main scanning direction or the sub-scanning direction. In this embodiment, the phase lead action and the phase delay action are given to the main scanning direction. The optical phase changing filter in this embodiment is a transmissive filter equipped with the above-mentioned two types of defined surfaces on the front and rear surfaces. The center thickness is set as thin as 0.2 mm, and hence the combined action can be obtained, and the same MTF defocus characteristics can be obtained in the main scanning direction and in the sub-scanning direction as shown in FIG. 9A.

At a position within a range of ±1 step of the focusing position, the stability MS is 6.0%, and sufficiently stable MTF characteristics can be obtained. Here, "1 step" is defined as equivalent of 0.025 mm. Therefore, the range of ±1 step of the focusing position corresponds to a movement range of an imaging plane as ±0.025 mm from the focusing position. If the surface is constituted of only the surface of FIG. 8A, there is still a variation of the MTF value between the main scanning direction and the sub-scanning direction as shown in FIG. 9B. At a position within a range of ±1 step of the focusing position, the stability MS is 11.3% that is not sufficient for stabilizing the MTF in order to solve the problem to be solved by the present invention. By combining the surface of FIG. 8B, the problem can be solved.

Figure 9A:
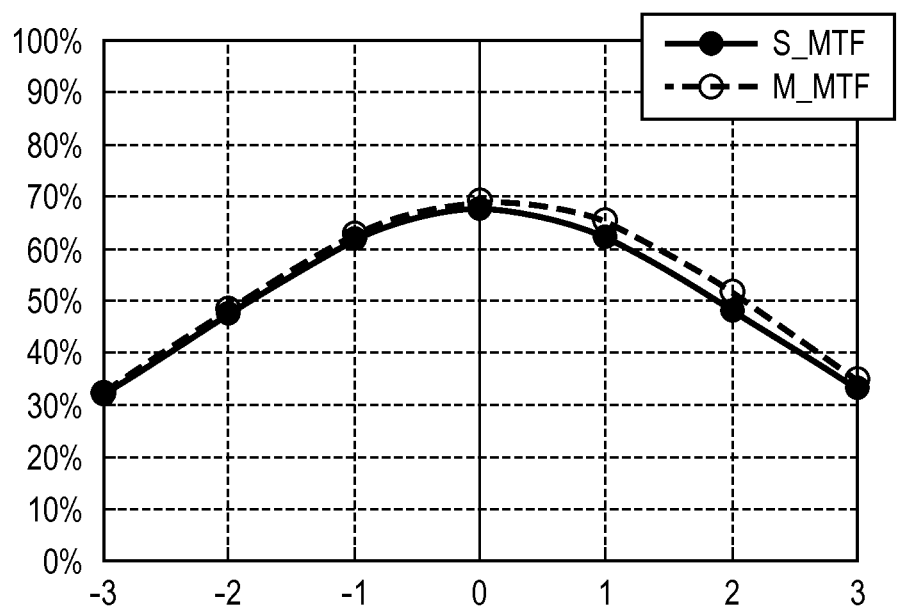
FIG. 9A is a graph showing MTF defocus characteristics of the second embodiment.
Figure 9B:
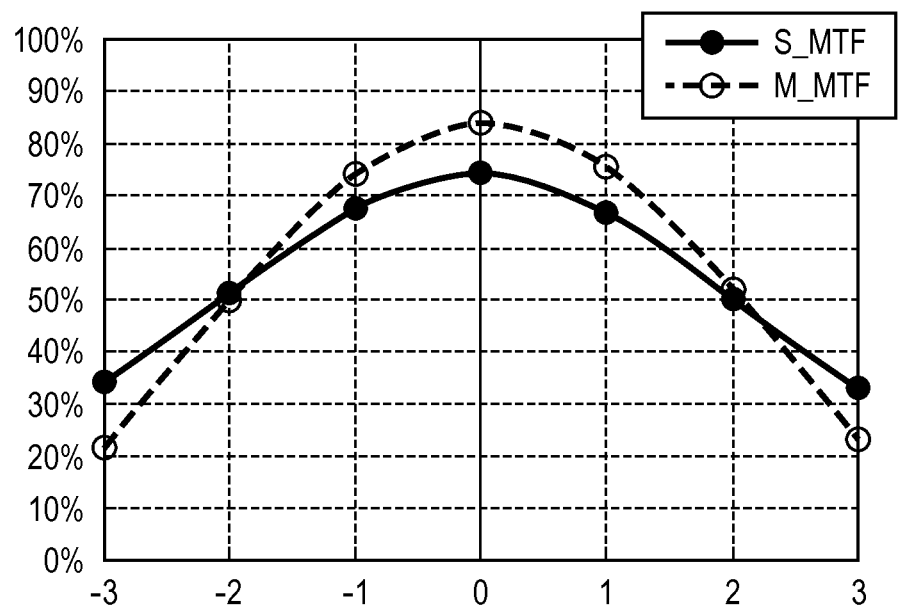
FIG. 9B is a graph showing the MTF defocus characteristics of the second embodiment.
Figure 10:
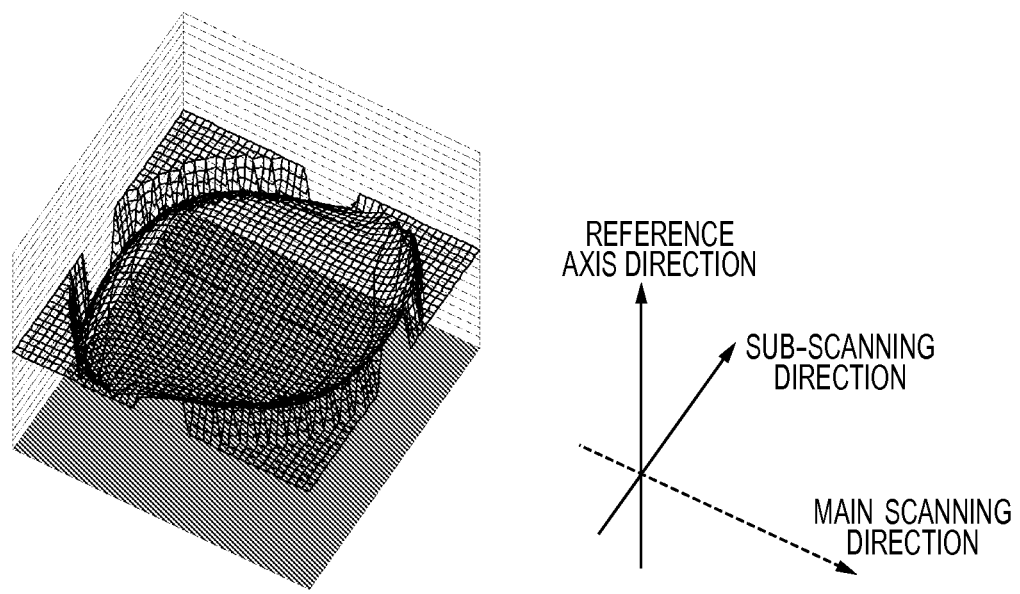
FIG. 10 is a diagram illustrating wavefront aberration of the second embodiment.

A wavefront aberration amount at the focusing position 0 of FIG. 9A is illustrated in FIG. 10. The aberration in the main scanning direction and the aberration in the sub-scanning direction are balanced, and fine waving aberration is generated. Thus, it is understood that the MTF stability has been improved. When the imaging optical system 24 having the above-mentioned configuration is used, only by inserting the transmissive optical phase changing filter in the conventional optical system, it is possible to provide the image reading apparatus that can support high speed reading by the larger aperture. The image reading apparatus of this embodiment is suitable for reading a document having an A3 size (300 mm×420 mm), for example.

Third Embodiment

Figure 11:
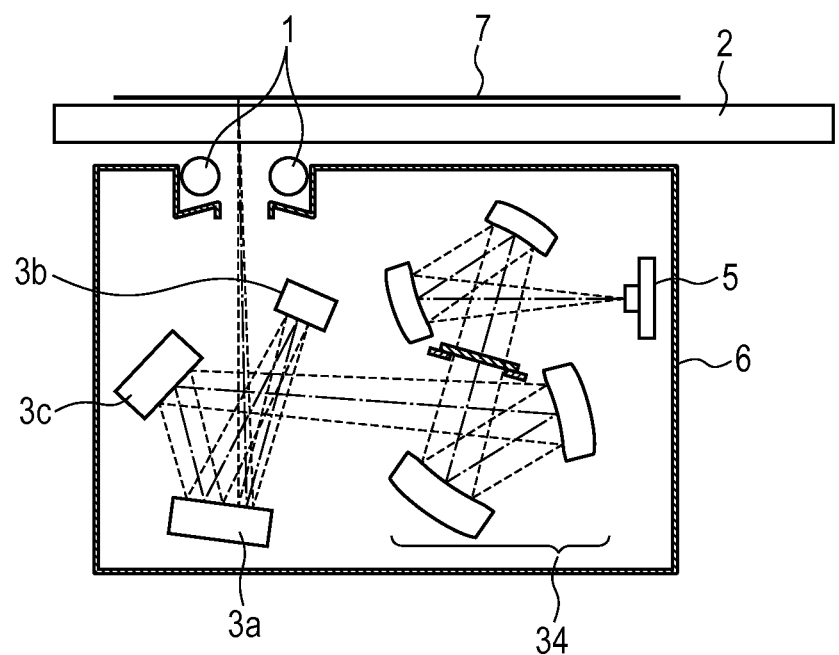
FIG. 11 is a schematic diagram of a main part of an image reading apparatus equipped with an image reading optical system according to a third embodiment of the present invention.
Figure 12:
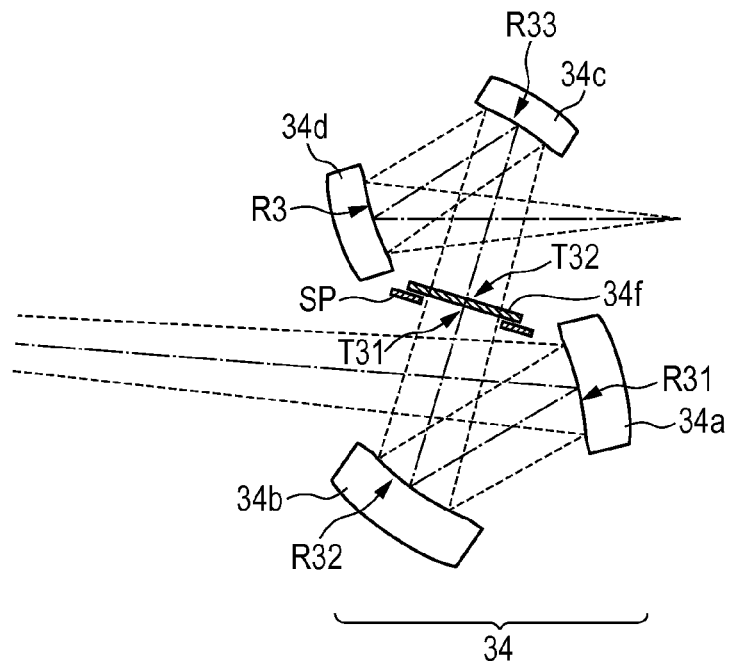
FIG. 12 is a cross-sectional view of a main part of the image reading optical system illustrating an entire configuration thereof in the YZ plane of the third embodiment.
Figure 13A:
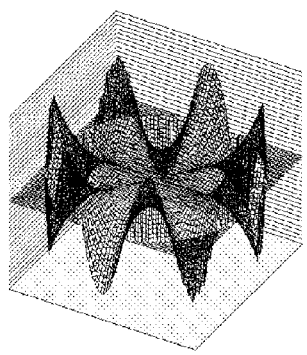
FIG. 13A is a schematic diagram illustrating a shape of an optical phase changing filter of the third embodiment.
Figure 13B:
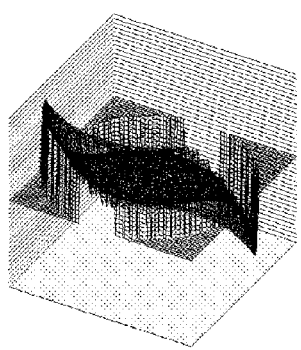
FIG. 13B is a schematic diagram illustrating a shape of the optical phase changing filter of the third embodiment.
Figure 13C:
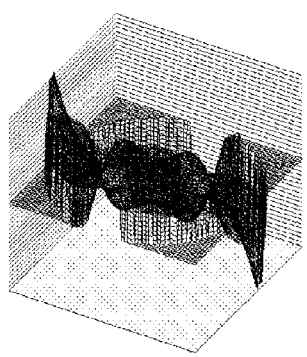
FIG. 13C is a schematic diagram illustrating a shape of the optical phase changing filter of the third embodiment.
Figure 13C:
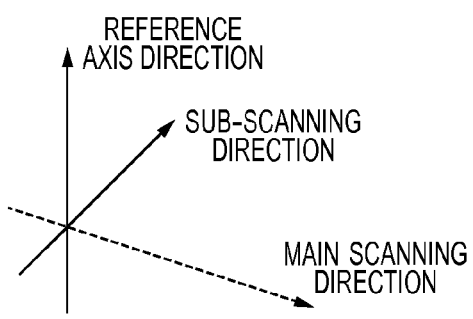

Hereinafter, an off-axial optical system according to a third embodiment of the present invention is described. FIG. 11 is a schematic diagram of a main part of an image reading apparatus of this embodiment in the sub-scanning cross section. FIG. 12 is a schematic diagram in the sub-scanning cross section when an imaging optical system 34 of FIG. 11 is extracted. FIGS. 13A, 13B and 13C are diagrams illustrating shapes of transmission surfaces T31 and T32 disposed on the optical phase changing filter of FIG. 12. The imaging optical system 34 is an off-axial optical system in which the surface normal at the reflection point of the reference axis light beam is not on the reference axis.

Free-form surface reflection members 34a, 34b, 34c and 34d are disposed to draw two shapes of figure "4" with an aperture stop SP and an optical phase changing filter 34f as substantially the center. The aperture stop SP is disposed on the transmission surface T31 of the optical phase changing filter 34f. For instance, the aperture stop is formed by attaching a black color resin sheet member to the surface of the optical phase changing filter or by other such methods. A linear image sensor 5 (light receiving unit) constituted of a CCD or the like is disposed at a position corresponding to an image plane. A carriage 6 (case) houses the individual members 1, 3a, 3b, 3c, 34, 5, and the like.

Here, an arranging direction of pixels of the linear image sensor 5 (X direction perpendicular to the drawing sheet) is regarded as a main scanning direction, and a direction perpendicular to the main scanning direction (Y direction in the drawing sheet) is regarded as a sub-scanning direction. A propagation direction of the beam is regarded as a Z direction. In this case, an XZ plane is a main scanning cross section, and a YZ plane is a sub-scanning cross section. In this embodiment, the beam emitted from the light source device 1 illuminates a document (object) 7 placed on a platen glass 2. Then, the beam from the document 7 enters an off-axial reflection surface R31 of the off-axial reflection surface member 34*a* via a first reflection mirror 3*a*, a second reflection mirror 3*b*, and a third reflection mirror 3*c*.

Further, after the beam reflected by the off-axial reflection surface R31 is reflected by an off-axial reflection surface R32, the beam passes through the surfaces T31 and T32 of the optical phase changing filter 34*f* in turn. Then, an image of the beam reflected by off-axial reflection surfaces R33 and R34 is formed on the linear image sensor 5.

Optical Phase Changing Filter in Third Embodiment

The optical phase changing filter in the third embodiment is basically the same as that in the first or second embodiment, but the transmission surface T31 as a single surface of the optical phase changing filter 34*f* as the transmissive filter has a surface shape having a characteristic illustrated in FIG. 13C. The surface shape illustrated in FIG. 13C is a combination (addition) of a first surface shape component illustrated in FIG. 13A and a second surface shape component illustrated in FIG. 13B.

1) First Surface Shape Component

The surface illustrated in FIG. 13A is a symmetric plane in which the same shape is obtained before and after rotation by an angle of 51.43° about a center axis to be a reference, and is expressed by the following Equation 6:

$$S(\rho,\phi) = A \times \rho^i \times \cos(m\phi + \alpha) \quad \text{Equation 6}$$

where $A = 0.410$ μm, $i = 4$, $m = 7$, and $\alpha = 180°$.

This angle 51.43° is equal to a value of 360/7 degrees, and hence this symmetry is generally called a seven-fold symmetry. This surface has protrusions and recesses repeated periodically about the center axis. The protrusion refracts light earlier than other areas, and hence the protrusion has the phase delay action of causing the beam wavefront to propagate later. The protrusion protrudes higher as being closer to a periphery from the center axis. On the other hand, the recess refracts light later than other areas, and hence the recess has the phase lead action of causing the beam wavefront to propagate earlier. The recess sinks deeper as being closer to a periphery from the center axis.

The beam is partially directed to positions before and after the focusing position as the imaging optical system by giving a phase lead and a phase delay periodically, and hence the defocus characteristics become stable before and after the focusing position. When the phase lead and the phase delay are repeated, there is no difference of the characteristics between the main scanning direction and the sub-scanning direction, and there is an effect that the defocus characteristics become stable in both directions.

2) Second Surface Shape Component

The surface illustrated in FIG. 13B is a surface in which the same shape is obtained only by rotating 360° about the center axis to be the reference, and is expressed by the following Equation 7:

$$T(\rho,\phi) = B \times \rho^j \times \cos(\phi + \beta) \quad \text{Equation 7}$$

where $B = 0.983$ μm, $j = 5$, and $\beta = 180°$.

This symmetry is called a one-fold symmetry. The surface has a characteristic of having the phase lead action and the phase delay action in one of two directions which are at right angles to each other but having none of the phase lead action and the phase delay action in the other direction. Therefore, the surface has an action of correcting aberration only in the main scanning direction or in the sub-scanning direction. In this embodiment, the phase lead action and the phase delay action are given to the sub-scanning direction, and the surface is combined with the surface of FIG. 13A. As a result, as shown in FIG. 14B, the same MTF defocus characteristics can be obtained in the main scanning direction and in the sub-scanning direction.

The optical phase changing filter in this embodiment is equipped with a surface obtained by combining the above-mentioned two types of defined surfaces (FIGS. 13A and 13B) on the transmission surface T31. The center thickness of the optical phase changing filter is 0.5 mm. At a position within a range of ±1 step of the focusing position, stability MS is 4.9%, and sufficiently stable MTF characteristics can be obtained. Here, "1 step" is defined as equivalent of 0.025 mm. Therefore, the range of ±1 step of the focusing position corresponds to a movement range of an imaging plane as ±0.025 mm from the focusing position.

Figure 14A:
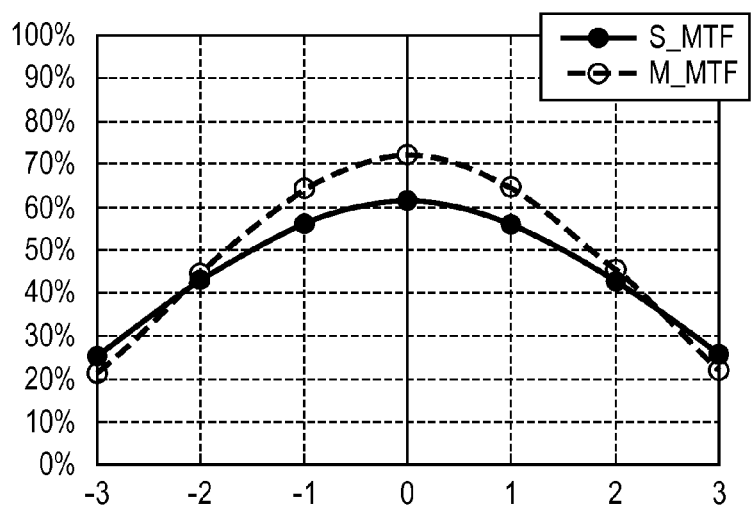
FIG. 14A is a graph showing MTF defocus characteristics of the third embodiment.

The conventional optical system including no optical phase changing filter has the MTF defocus characteristics as shown in FIG. 14A, and there is a large problem in that the stability MS is 12.3%. In addition, if the transmission surface T31 is constituted of only the surface of FIG. 13A, there is still a variation of the MTF value between the main scanning direction and the sub-scanning direction as shown in FIG. 14C. In this configuration, the stability MS is 16.5% at a position within a range of ±1 step of the focusing position, and there is no effect for stabilizing the MTF in order to solve the problem to be solved by the present invention, but the problem can be solved by combining the surface of FIG. 13B.

Figure 14B:
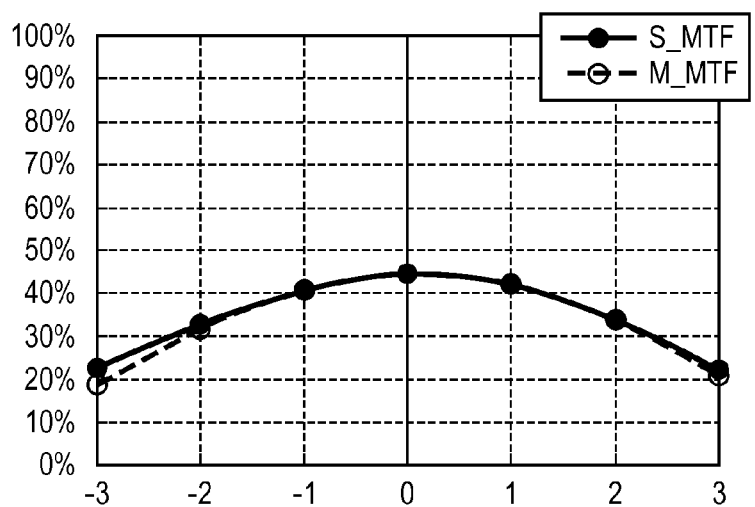
FIG. 14B is a graph showing the MTF defocus characteristics of the third embodiment.
Figure 14C:
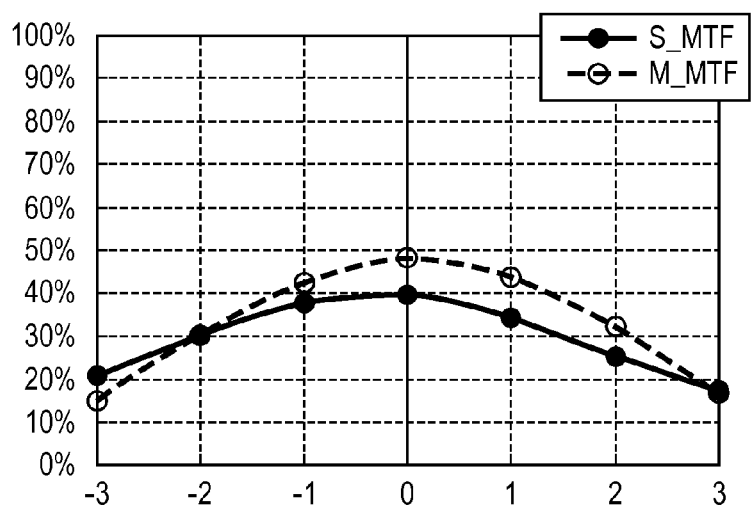
FIG. 14C is a graph showing the MTF defocus characteristics of the third embodiment.

A wavefront aberration amount at the focusing position 0 of FIG. 14B is illustrated in FIGS. 15A and 15B. The aberration in the main scanning direction and the aberration in the sub-scanning direction are balanced, and fine waving aberration is generated. Thus, it is understood that the MTF stability has been improved. The wavefront aberration is rapidly increased in the outermost periphery in the sub-scanning direction, but there is no problem because the area thereof is very small. When the imaging optical system 34 having the above-mentioned configuration is used, only by inserting the transmissive optical phase changing filter in the conventional optical system, it is possible to provide the image reading apparatus that can support high speed reading by the larger aperture.

The image reading apparatus of this embodiment described above is suitable for reading a document having an A3 size (300 mm×420 mm), for example.

The exemplary embodiments of the present invention are described above, but the present invention is not limited to these embodiments and can be changed and modified variously within the spirit thereof.

A list of the embodiments is as follows.

|  | A (μm) | i | m | α (°) | B (μm) | j | β (°) |
|---|---|---|---|---|---|---|---|
| First Embodiment | 0.109 | 5 | 5 | 0 | 0.164 | 5 | 180 |
| Second Embodiment | 0.205 | 3 | 3 | 180 | 0.287 | 7 | 90 |

-continued

| | A (μm) | i | m | α (°) | B (μm) | j | β (°) |
|---|---|---|---|---|---|---|---|
| Third Embodiment | 0.410 | 4 | 7 | 180 | 0.983 | 5 | 180 |

A and B are constants. The integer m that is 2 or larger is a value indicating rotation symmetry, which is set to a value within a range from 3 to 5 in the embodiments of the present invention. If the integer m is smaller than 3, it is not preferred because the MTF characteristics may be uneven partially in a direction such as the main scanning direction or the sub-scanning direction. Even if the integer m is set larger than 5, the effect of the present invention is obtained. However, if the integer m is 8 or larger, it is not preferred because a fine waving component of the wavefront aberration is increased, so that high frequency MTF characteristics are affected. Therefore, the effect of the present invention becomes more effective by setting the integer m from 3 to 7.

The values i and j determine the shape in the radial direction. It is necessary to have the phase lead action for leading a wavefront of a beam or the phase delay action for delaying the wavefront, and it is necessary to have the curved surface shape. Therefore, the values i and j needs to be 2 or larger to obtain the effect of the present invention.

The shape in the radial direction is not necessarily specified by the above-mentioned function. However, if the shape has an inflection point, it is not preferred because an unnecessary waving component is increased in the wavefront aberration, so that the high frequency MTF characteristics are affected. Therefore, it is preferred to satisfy the following conditional expression:

$$\text{in an area of } \rho>0, d^2(S+T)/d\rho^2 \neq 0.$$

This corresponds to the condition that there is no inflection point in the shape in the radial direction.

Modified Example 1

In the above-mentioned embodiments, there are described cases of an anamorphic imaging optical system including the non-coaxial optical element (including an optical element having different cross section shapes in the main scanning direction as the longitudinal direction of the slit area and in the sub-scanning direction perpendicular to the main scanning direction), but the present invention is not limited thereto. The present invention may also be applied to an anamorphic imaging optical system including a coaxial optical element (including an optical element having different cross section shapes in the main scanning direction as the longitudinal direction of the slit area and in the sub-scanning direction perpendicular to the main scanning direction). In addition, a plurality of optical elements may be disposed, or a single optical element may be disposed.

Modified Example 2

Note that, the linear image sensor is used as the image sensor disposed on an imaging plane for imaging the slit area of the document, but it is possible to use an area image sensor.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2011-236966, filed Oct. 28, 2011, and No. 2012-231142, field Oct. 18, 2012, which are hereby incorporated by reference herein in their entirety.

What is claimed is:

1. An image reading optical system, comprising:
    an imaging optical system which is used for imaging a slit area of a document on an image sensor and includes an optical element having different cross section shapes in a main scanning direction as a longitudinal direction of the slit area and in a sub-scanning direction perpendicular to the main scanning direction;
    an aperture stop disposed in an imaging optical path from the document to the image sensor; and
    an optical phase changing filter which is disposed adjacent to the aperture stop and includes a phase lead area having a phase lead action of leading a phase of a wavefront of an incident beam, and a phase delay area having a phase delay action of delaying the phase of the wavefront of the incident beam, with reference to a wavefront phase at a center of the incident beam,
    wherein the optical phase changing filter includes a surface shape component that is symmetric only with respect to a predetermined plane including a surface normal at the center of the incident beam and one of the main scanning direction and the sub-scanning direction, and
    wherein, with respect to a surface that includes the surface normal at the center of the incident beam and is perpendicular to the predetermined plane, one side is the phase lead area, and another side is the phase delay area.

2. An image reading optical system, comprising:
    an imaging optical system which is used for imaging a slit area of a document on an image sensor and includes an optical element having different cross section shapes in a main scanning direction as a longitudinal direction of the slit area and in a sub-scanning direction perpendicular to the main scanning direction;
    an aperture stop disposed in an imaging optical path from the document to the image sensor; and
    an optical phase changing filter which is disposed adjacent to the aperture stop and includes a phase lead area having a phase lead action of leading a phase of a wavefront of an incident beam, and a phase delay area having a phase delay action of delaying the phase of the wavefront of the incident beam, with reference to a wavefront phase at a center of the incident beam,
    wherein the optical phase changing filter includes, on one of a single surface and different surfaces of the optical phase changing filter:
        a first surface shape component that is symmetric with respect to a plurality of symmetric planes including a surface normal at the center of the incident beam; and
        a second surface shape component that is symmetric only with respect to a predetermined plane including the surface normal at the center of the incident beam and one of the main scanning direction and the sub-scanning direction, and
    wherein in the first surface shape component and the second surface shape component, with respect to a surface that includes the surface normal at the center of the incident beam and is perpendicular to one of the predetermined plane and the plurality of symmetric planes, one side is the phase lead area, and another side is the phase delay area.

3. An image reading optical system according to claim 2, wherein a number of the multiple symmetric planes is three or larger.

4. An image reading optical system according to claim 3, wherein the number of the multiple symmetric planes is seven or smaller.

5. An image reading optical system according to claim 2, wherein the first surface shape component is expressed by the following equation:

$$S(\rho,\phi)=A\times Q(\rho)\times\cos(m\phi+\alpha),$$

where m is an integer of two or larger, ρ is a coordinate in a radial direction, is a value normalized by a radius, and satisfies 0≤ρ≤1, Q(ρ) is a shape in the radial direction, φ is a coordinate in a rotation direction and satisfies 0≤φ≤2π, and A is a constant.

6. An image reading optical system according to claim 2, wherein the second surface shape component is expressed by the following equation:

$$T(\rho,\phi)=B\times R(\rho)\times\cos(\phi+\beta),$$

where R(ρ) is a shape in a radial direction, and B is a constant.

7. An image reading optical system according to claim 5, wherein the shape in the radial direction comprises a shape without an inflection point.

8. An image reading optical system according to claim 6, wherein the shape in the radial direction comprises a shape without an inflection point.

9. An image reading optical system according to claim 1, wherein the optical element comprises a non-coaxial reflection surface.

10. An image reading optical system according to claim 2, wherein the optical element comprises a non-coaxial reflection surface.

11. An image reading apparatus, comprising:
an image sensor; and
an image reading optical system, including:
an imaging optical system which is used for imaging a slit area of a document on an image sensor and includes an optical element having different cross section shapes in a main scanning direction as a longitudinal direction of the slit area and in a sub-scanning direction perpendicular to the main scanning direction;
an aperture stop disposed in an imaging optical path from the document to the image sensor; and
an optical phase changing filter which is disposed adjacent to the aperture stop and includes a phase lead area having a phase lead action of leading a phase of a wavefront of an incident beam, and a phase delay area having a phase delay action of delaying the phase of the wavefront of the incident beam, with reference to a wavefront phase at a center of the incident beam,
wherein the optical phase changing filter includes a surface shape component that is symmetric only with respect to a predetermined plane including a surface normal at the center of the incident beam and one of the main scanning direction and the sub-scanning direction, and
wherein, with respect to a surface that includes the surface normal at the center of the incident beam and is perpendicular to the predetermined plane, one side is the phase lead area, and another side is the phase delay area.

12. An image reading apparatus, comprising:
an image sensor; and
an image reading optical system, including:
an imaging optical system which is used for imaging a slit area of a document on an image sensor and includes an optical element having different cross section shapes in a main scanning direction as a longitudinal direction of the slit area and in a sub-scanning direction perpendicular to the main scanning direction;
an aperture stop disposed in an imaging optical path from the document to the image sensor; and
an optical phase changing filter which is disposed adjacent to the aperture stop and includes a phase lead area having a phase lead action of leading a phase of a wavefront of an incident beam, and a phase delay area having a phase delay action of delaying the phase of the wavefront of the incident beam, with reference to a wavefront phase at a center of the incident beam,
wherein the optical phase changing filter includes, on one of a single surface and different surfaces of the optical phase changing filter:
a first surface shape component that is symmetric with respect to a plurality of symmetric planes including a surface normal at the center of the incident beam; and
a second surface shape component that is symmetric only with respect to a predetermined plane including the surface normal at the center of the incident beam and one of the main scanning direction and the sub-scanning direction, and
wherein in the first surface shape component and the second surface shape component, with respect to a surface that includes the surface normal at the center of the incident beam and is perpendicular to one of the predetermined plane and the plurality of symmetric planes, one side is the phase lead area, and another side is the phase delay area.

* * * * *